Jan. 22, 1963
D. E. CARTER     3,074,921
REMOVAL OF CATALYST RESIDUES FROM SOLID POLYMER SLURRIES
BY MULTISTAGE COUNTERCURRENT EXTRACTION
Filed June 14, 1957
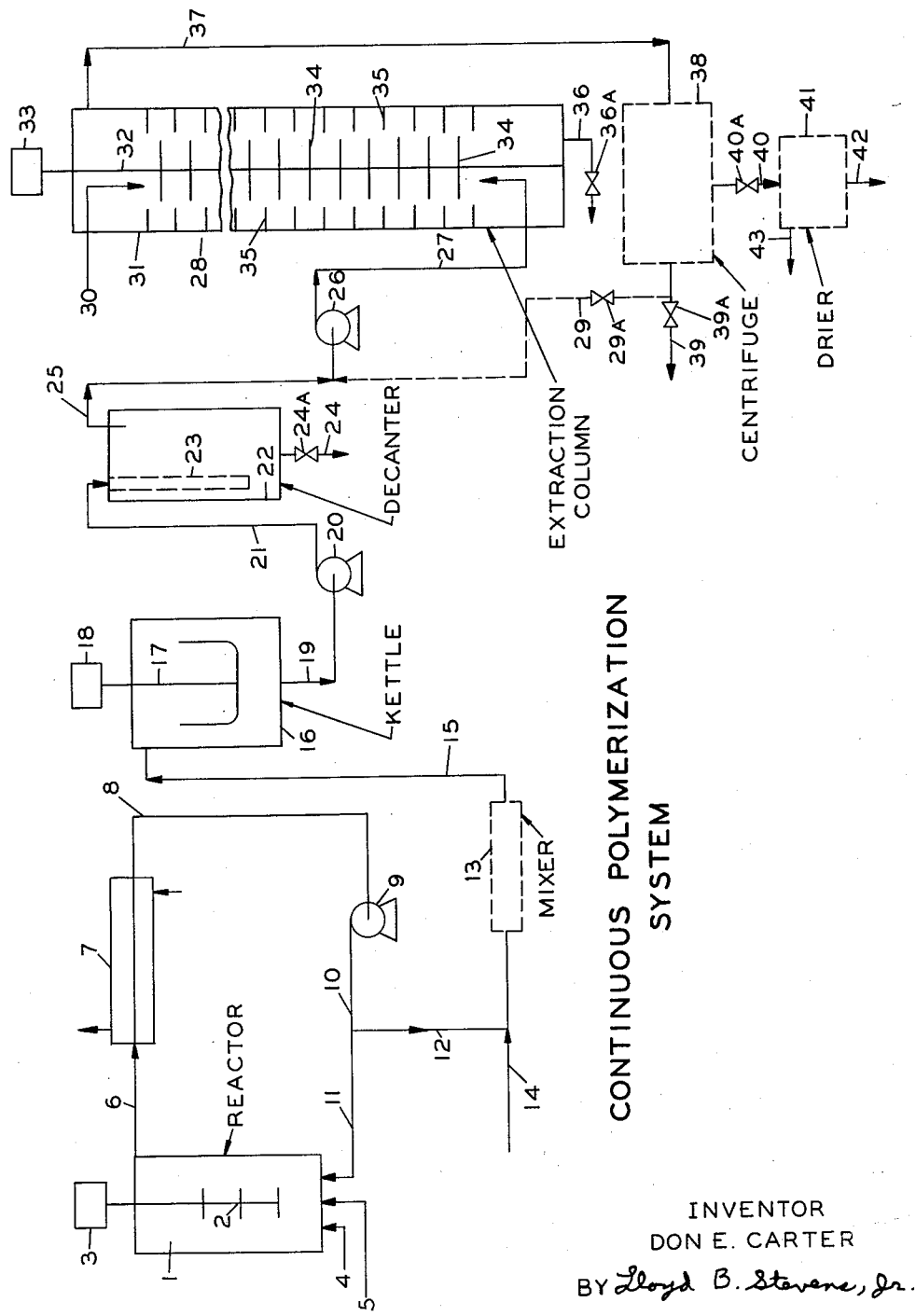
INVENTOR
DON E. CARTER
BY *Lloyd B. Stevens, Jr.*
ATTORNEY United States Patent Office 3,074,921
Patented Jan. 22, 1963

3,074,921
REMOVAL OF CATALYST RESIDUES FROM SOLID POLYMER SLURRIES BY MULTISTAGE COUNTERCURRENT EXTRACTION
Don E. Carter, Dayton, Ohio, assignor to Monsanto Chemical Company, St. Louis, Mo., a corporation of Delaware
Filed June 14, 1957, Ser. No. 665,741
19 Claims. (Cl. 260—94.9)

The invention relates to removal of Ziegler catalyst residue from solid polymer particles slurried in a suitable liquid medium, and particularly to decantation removal and/or counter-current multistage solvent extraction of catalyst from Ziegler-type polymers. In preferred aspects, the invention pertains to decantation removal with methanol and extraction with methanol or aqueous methanol of catalyst formed by the interaction of a trialkyl aluminum with titanium tetrachloride from solid polyethylene particles slurried in a aliphatic hydrocarbon liquid.

As is indicated in detail in the copending application of Ival O. Salyer et al., Serial No. 532,365, filed September 2, 1955, now Patent No. 2,985,617, the presence of trace amounts of catalyst residues particularly in the Ziegler-type polymers is believed to be at least one of the factors presenting stabilization problems in these polymers. At the time of the filing of the Salyer et al. application referred to above, no practical method of reducing these Ziegler catalyst residues to a sufficiently low level as not to cause stabilization problems was known. Therefore, in this prior application stabilizing additives were provided to stabilize the polymers. One of the most serious of these problems resulting from the presence of these catalyst residues is the development of color during thermal processing of the polymer making the polymers unsuitable for uses where light color or no color is desired. Loss of tensile elongation and certain other undesirable effects also take place in the polymer. Another undesirable effect is corrosion of metallic apparatus with which the hot polymer comes into contact such as mill rolls, injection machines, molds, and the like.

A number of methods of removing the Ziegler catalyst residues have been tried, especially centrifuging and washing of the centrifuged material. Sometimes polymers of satisfactory commercial quality are produced by centrifuging and washing but it has been found that good quality polymers, i.e., with sufficiently low catalyst residue levels cannot be consistently produced. Presumably, the polymer layer deposited in the centrifuge will develop cracks whereby the washing fluid channels and so does not satisfactorily wash the catalyst residues from the polymer. Another disadvantage of the centrifugal method is that filter rates are slow and the centrifuge cloth tends to become plugged with polymer quickly with the result that frequent cleaning of the cloth is needed and operating costs of the centrifuging method increase very appreciably making the method commercially unattractive. Also, in the centrifuge and washing method wherein the cake deposited in the centrifuge is washed, high solvent usage has been required of the order of about 10 lbs. of solvent per pound of polymer. As will be seen below in the detailed discussions of the invention, solvent usage is very appreciably lower in the continuous extraction method of the invention, being of the order of 2 to 3 lbs. solvent/lb. polymer.

It has now been found that polymers containing Ziegler catalyst residues can be processed to remove most of these residues by contacting the solid polymer particles slurried in a suitable organic liquid with an alcohol, preferably at elevated temperatures, and separating, e.g., by decantation, at a temperature at which phase separation will occur, the alcohol layer rich in catalyst from the polymer slurry layer. The alcohol to be used must, of course, be chosen with the slurrying medium being used in mind so phase separation can be effected. Cooling or refrigeration may be required in some instances to effect the phase separation. Also, of course, the alcohol must not extract the polymer from the slurrying medium.

It has been found that polymers containing Ziegler catalyst residues can be processed to satisfactory commercial quality for most any conceivable use by countercurrent multistage solvent extraction of the solid polymer particles slurried in a suitable organic liquid using a liquid Ziegler catalyst residues solvent. This solvent must have the properties under extraction conditions of not being more than partially miscible with the slurrying medium and not extract the polymer from the slurrying medium. Preferred solvents for the extraction process are hydroxyl-group-containing solvents, particularly alcoholic media containing 90% or more alcohol. However, aqueous media containing 90% or more water will also extract appreciable amounts of the Ziegler catalyst residues from Ziegler polymer particles. Obviously, from what has been said any ratio of alcohol to water in a mixture of them is operable, but if an alcohol extractant is to be used, it is preferred to use anhydrous alcohol or alcohol containing small percentages (less than 10% and usually 1% to 5%) of a countersolvent to facilitate the separation of the alcoholic media from the slurrying medium. Water is normally a good countersolvent for alcohols and also certain inorganic salts can be used, but, of course, there are many other suitable countersolvents. Likewise, if aqueous media are to be used normally it will be preferred to use substantially pure water, water containing small amounts of wetting agents, or weak acids, etc., i.e., aqueous media containing at least 90% water although obviously aqueous media containing less than 90% water will be operable. The Ziegler catalyst residues which need to be removed can include active catalysts, inactive catalysts, and decomposition products thereof remaining in the polymer after the polymerization step or other subsequent steps such as quenching of the polymerization reaction, etc. Liquids have, of course, been subjected to countercurrent extraction previously and possibly colloidal solutions but apparently no one believed that solid polymer particles having dimensions in microns rather than fractions of a micron could be practically processed in this manner to reduce these catalyst residues therein to a sufficiently low level such that these residues would no longer be a problem as a practical matter.

It is an object of this invention to provide a method of removing the great bulk of the Ziegler catalyst residues from solid Ziegler polymer particles.

It is another object of this invention to provide a method for reducing Ziegler catalyst residues in solid polymers to a commercially acceptable level which method is particularly designed for operation as a step in a continuous polymerization process for the production of solid polymers.

It is still another object of this invention to provide an improved method of producing polymer of good commercial quality by reducing Ziegler catalyst residues therein which method can suitably be used on polymer produced either by batch or continuous polymerization methods.

It is a further object of this invention to provide a solvent extraction method of removing Ziegler catalyst residues from solid polymers wherein the solvent usage per pound of polymer processed is low.

It is a still further object of this invention to provide an economical process for removing Ziegler catalyst residues from polymers resulting in the production of satisfactory commercial polymers.

It is a particular object of this invention to provide a method of removing Ziegler-type catalyst residues from solid polyethylene particles produced by the Ziegler method resulting in solid polyethylene of good color and processability.

These and other objects of the invention will become apparent as the detailed description of the invention proceeds.

The Ziegler-type catalysts useful for the polymerization of ethylene and other monomers have been proposed by Professor Dr. Karl Ziegler of the Max Planck Institute at Mulheim, Ruhr, Germany. These catalysts are disclosed in considerable detail in the co-pending application of Ival O. Salyer et al., Serial No. 532,365, filed September 2, 1955, now Patent No. 2,985,617. Probably the preferred group of these catalysts is that disclosed in Belgian Patent No. 533,362, issued May 16, 1955, to Ziegler, the disclosure of which is hereby incorporated herein by reference, namely catalysts prepared by the interaction of a trialkylaluminum with a compound of a metal of group IV–B, V–B or VI–B of the periodic system, including thorium and uranium, and especially compounds of titanium, zirconium and chromium. These, and the variety of other catalysts of the Ziegler type, can be considered exemplified by the catalyst obtained by the interaction of a trialkylaluminum with titanium tetrachloride. Other catalysts of the Ziegler type differ from those disclosed in the above-mentioned Belgian Patent No. 533,362 in various ways, for example, as follows: Instead of or in addition to the aluminum trialkyls, catalysts of the type described in the said Belgian patent can be made by reacting the various metal compounds of groups IV–B, V–B and VI–B disclosed therein with aluminum compounds of the general formula $RAlX_2$, where R is hydrogen or hydrocarbon, X means any other substituent including hydrogen or hydrocarbon, particularly dialkyl or diaryl aluminum monohalides, also aluminum hydride, alkyl or aryl aluminum dihydrides, dialkyl or diaryl aluminum hydrides, alkyl or aryl aluminum dihalides, alkyl or aryl aluminum dialkoxy or diaryloxy compounds, dialkyl or diaryl aluminum alkoxy or aryloxy compounds. Similarly, instead of or in addition to the organoaluminum compounds, organic compounds of magnesium or zinc can be used, and these can contain either a single or two hydrocarbon radicals, those of especial interest being Grignard compounds, magnesium dialkyls, mixed organo zinc compounds such as $C_2H_5ZnI$ and zinc dialkyls, all of these, of course, being reacted with compounds of group IV–B, V–B or VI–B metals. Another Ziegler type catalyst is prepared by the interaction of an aluminum compound of the general formula $R_2AlX$ where R is a hydrocarbon radical such as alkyl or aryl, and X is a halogen, such as chlorine or bromine, with a compound of a metal of group VIII of the periodic system, e.g., iron, nickel, cobalt, or platinum, or manganese, for example, dimethylaluminum monobromide plus ferric chloride, diisobutylaluminum chloride plus nickel (trivalent) chloride, diethylaluminum monochloride plus manganic chloride. Yet another combination is that of the group IV–B, V–B or VI–B metal compounds with aluminum compounds of the general formula $R_2AlX$, where R is hydrogen or a hydrocarbon radical and X is the radical of a secondary amine, a secondary acid amide, a mercaptan, a thiophenol, a carboxylic acid, or a sulfonic acid, e.g., piperidyl diethylaluminum plus $TiCl_4$, dimethylaminodiethylaluminum plus zirconium tetrachloride, ethylmercaptodiethylaluminum plus $TiCl_4$. Another of the classes of Ziegler type polymerization catalysts comprises compounds of the group IV–B, V–B and VI–B heavy metals as previously mentioned, combined with the alkali metal alkyls, for example, with lithium-, sodium-, or potassium methyl, -ethyl, -benzyl, -isobutyl, or with complex compounds of such alkali metal alkyls with organic compounds of aluminum, magnesium or zinc as mentioned above, or complex compounds of alkali metal hydrides with such organic compounds of aluminum, magnesium or zinc, for example, butyl lithium plus zirconium tetrachloride, sodium tetramethylaluminum plus titanium tetrachloride or plus thorium acetylacetonate. Other Ziegler-type catalysts are prepared by using (in conjunction with compounds of group IV–B, V–B and VI–B metals), instead of trialklaluminums, triaryl-, triarylalkyl-, trialkaryl- or mixed alkyl- and arylaluminum, zinc, magnesium or alkali metals, e.g., phenyl sodium plus $TiCl_4$.

Those skilled in the polymerization art having knowledge of these matters, refer to catalysts of the foregoing type as Ziegler or Ziegler-type polymerization catalysts, and to polymers prepared by their action as Ziegler or Ziegler-type polymers, the terms "Ziegler" and "Ziegler-type" being used synonymously. While the principal classes of such catalysts have been listed, this listing is not to be construed as complete, and various other such catalysts than those set forth may also be used to produce polymers which, in accordance with the invention of the present application, are stabilized as will be described hereinafter. Thus, ethylene and other monomers can be polymerized by catalysts obtained by treating compounds of heavy metals, especially compounds of the group IV–B, V–B and VI–B metals, not with organo-metallic compounds but rather by reducing agents such as: alkali metals, e.g., lithium, sodium, potassium; alkali hydrides, e.g., lithium hydride, sodium hydride; complex alkali aluminum and alkali boron hydrides, e.g., lithium aluminum hydride; complexes of alkali metal hydrides with boron triaryls or boric acid esters or boronic acid esters; and especially titanium and zirconium halides reduced by zinc or alkaline earth metals or other earth metals including the rare earths, or hydrides of same; said reductions being effected in the complete absence of oxygen, moisture, and compounds containing active hydrogen atoms as determined by the Zerewitinoff method. Polymers of low to medium molecular weight can be obtained from ethylene and other monomers by using trialkylaluminums alone as catalysts, especially in very small amounts, as well as dialkyl berylliums, trialkyl galliums, trialkyl indiums, monoalkylaluminum dihydrides, and the various other catalysts disclosed by Ziegler in U.S. Patent No. 2,699,457. Attention is further directed to the teaching of various of the foregoing catalysts in Ziegler's Belgian Patents 534,792 and 534,888, the disclosures of which are likewise hereby incorporated herein by reference.

The present invention is broadly applicable to all Ziegler-type solid polymers, i.e., all solid polymers prepared by polymerizing a monomer or mixture of monomers in the presence of a Ziegler-type catalyst. Of especial interest, of course, are those Ziegler solid polymers of sufficiently high molecular weight to be useful in the plastics industry. The preferred polymers have a molecular weight of at least 2,000 and preferably more than 10,000. Those Ziegler polymers to which the present invention is applied with particular advantage generally have much higher molecular weights ranging from 20,000 to 50,000 or 100,000 and even in many cases as high as 1,000,000 to 3,000,000 or more. The molecular weights in question are those calculated in the conventional manner on the basis of the viscosity of the polymer in solution as described in the Journal für Praktische Chemie, 2nd Series, vol. 158, page 136 (1941), and J.A.C.S. 73, page 1901 (1951).

At the present time, ethylene is by far the preferred monomer for preparing Ziegler polymers. The ethylene can be homopolymerized, or can be copolymerized with varying amounts, particularly on the order of from 2 to 10 percent, of higher olefins such as propylene or butylene, especially the former. The ethylene can also be copolymerized with butadiene and/or isoprene as disclosed in the copending application of Carroll A. Hochwalt, Serial No. 502,008, filed April 18, 1955. Also of interest are the copolymers of butadiene and/or isoprene with styrene, disclosed in the copending application of Carroll A. Hochwalt, Serial No. 501,795, filed April 18, 1955. Homopolymers of butadiene and of isoprene as prepared by the use of Ziegler-type catalysts are also of great interest, having exceptional low temperature properties, as disclosed in the copending application of Robert J. Slocombe, Serial No. 502,189, filed April 18, 1955. Other ethylenically unsaturated hydrocarbons whose Ziegler polymers are of potential interest include propylene, butylenes, especially butene-1, amylenes and the like. Substituted olefins are also of interest, such as vinylcyclohexene, styrene, etc. Styrene when polymerized in the presence of Ziegler-type catalysts gives a high molecular weight polymer showing a crystalline structure by X-ray diffraction examination. Styrene and other olefins can be polymerized with Ziegler catalyst without the use of a slurrying medium for the polymer, in which case for the decantation and extraction steps, it would be necessary to first slurry the polystyrene or other polyolefin. Ziegler-type polyvinyl ethers, especially the homopolymers of alkyl vinyl ethers, e.g., ethyl vinyl ether, 2-ethylhexyl vinyl ether, etc., and copolymers of same with ethylene and other copolymerizable ethylenically unsaturated comonomers, as disclosed in the copending application of Earl W. Gluesenkamp, Serial No. 507,717, filed May 11, 1955, now Patent No. 3,026,290, can also be stabilized in accordance with the present invention. A variety of copolymers of the various monomers named above with each other and with other comonomers can be prepared by Ziegler catalysis, and the present invention in its broadest scope includes all such and in fact all polymers prepared through the agency of Ziegler type catalysts on any single monomer or mixture of monomers polymerizable with such catalysts. Despite the broad scope of the invention, it will be found more convenient in most of the present application to discuss the invention with specific reference to preferred embodiments thereof, and accordingly, Ziegler type polyethylene will be especially referred to by way of example.

Any suitable liquid slurrying medium which will tend to retain the polymers suspended therein can be used. Preferably the slurrying medium should be low boiling so that trace amounts of the slurrying medium can be removed conventionally in a drying step. Slurrying mediums can be saturated aliphatic and alicyclic, and aromatic hydrocarbons, halogenated hydrocarbons and saturated ethers—of these the hydrocarbon solvents generally being preferred. If the extraction column is run under pressure and/or at low temperature, such slurrying mediums as propane, isobutane, and n-butane could be used, but normally it will be preferred to use higher boiling solvents such as the pentanes, n-hexane, the various isomeric hexanes, cyclohexane, methylcyclopentane, and methylcyclohexane, dodecane, n-heptane, isooctanes, industrial solvents composed of saturated and/or aromatic hydrocarbons, such as kerosenes, naphthas, etc. Also, benzene, toluene, ethylbenzene, cumene, decalin, ethylenedichloride, chlorobenzene, diethylether, o-di-chlorobenzene, dibutylether can be used. However, the saturated aliphatic hydrocarbons having between 5 and about 12 carbon atoms per molecule are preferred slurrying mediums, or from 3 to about 12, if pressure or low temperature is used in the extraction apparatus.

If a slurrying medium is used in the polymerization step, it will normally be used in amounts within the range of about 3 parts by weight of slurrying medium to 1 part by weight of polymer produced, i.e., 3/1 ratio, to a 15/1 ratio, although it should be understood that sometimes no slurrying medium is used in the polymerization step and also that lower or higher ratios are usable.

In the extraction step, normally it will be preferred to use a slurrying medium to polymer weight ratios within the range of about 5/1 to 20/1, although, it should be understood that somewhat lower or appreciably higher ratios can be used, if desired. For good extraction of the Ziegler catalyst residues, it is desirable that the slurried polymer layer not be too viscous, but of course the use of excessively large amounts of slurrying medium will be uneconomic requiring increased size extraction and other equipment to handle the increased volume.

The solvent used to extract the Ziegler catalyst residue from the polymer must, of course, not be more than partially miscible in the particular slurrying medium used for the polymer particles and must not preferentially extract the polymer from its slurrying medium under extraction conditions. Also, of course, the extraction solvent should be a good solvent for the Ziegler catalyst residues. Normally it will be preferred to use a solvent more dense than the polymer slurry so the polymer can be fed near the bottom of the extraction column and flow upward against the downcoming extraction solvent introduced near the top of the column, because by such operation catalyst residues will not only be dissolved from the polymer but undissolved material will tend to settle out of the polymer slurry and proceed down the column and out with the extracting medium. However, the reverse type of operation can be used wherein the extracting liquid is less dense than the polymer slurry and is introduced near the bottom of the column with the polymer slurry being introduced near the top of the extraction column. In general, liquid alcohols are usable as the catalyst residue extraction mediums provided the alcohol is not more than partially miscible with the particular slurrying medium being used under extraction conditions. A number of specific alcohols satisfactory for use with such slurrying mediums such as kerosene, n-heptane, isooctanes, n-hexane, and the like are methanol, furfuryl alcohol, tetrahydrofurfuryl alcohol, 2-chloroethanol and chloropropanols, and these particular alcohols would also be usable with pentanes, butanes, and propane slurrying mediums, if the extraction were carried out under pressure and/or at low temperature. The addition of less than 10% water, preferably 1 to 5% of water to alcohols reduces the miscibility of the alcohol with slurrying mediums and so improves the efficiency of the extraction. In general, aliphatic alcohols having from about 1 to 8 carbon atoms per molecule are desirable extractants for the catalyst residues, but it may be necessary to use water particularly with ethanol and higher alcohols to reduce miscibility with the slurrying medium and/or choose a slurrying medium with the particular alcohol in mind, and/or conduct the extraction at reduced temperatures, e.g., methyl alcohol, ethyl alcohol, n-propyl alcohol, isopropyl alcohol, n-butyl alcohol, isobutyl alcohol, tertiary butyl alcohol, secondary butyl alcohol, any of the amyl alcohols many of which are commercially available as single or mixed alcohols, the various hexyl, heptyl, and octyl alcohols, and particularly n-heptyl alcohol, n-octyl alcohol, isooctyl alcohol, 2-ethylhexyl alcohol. Also higher alcohols can be used such as dodecyl alcohol, and even higher alcohols such as octadecyl alcohol, cetyl alcohol, etc., alcohols of the type obtained by recation of olefins with carbon monoxide and hydrogen in accordance with the "Oxo" process and several of which are commercially available cyclohexanol, 2-ethylcyclopentanol, cyclohexyl carbinol, phenylcyclohexanol, ethylene glycol, triethylene glycol, the various "Cellosolves" and "Carbitols," propylene glycol, glycerine, benzyl alcohol, methyl phenyl carbinol. While all of the alcohols so far mentioned are free from aliphatic unsaturation, alcohols containing the same, for example, cyclohexenol, allyl alcohol, etc. can be used although there would seldom be any advantage. While the unsubstituted alcohols are particularly useful, the alcohols can, if desired, be substituted with one or more substituents, which do not interfere with the treatment, for example, halo-, keto-, ether-radicals. The various phenols, for example, phenol, cresol, $\beta$-naphthol, resorcinol, can also be used. However, as stated above, the choice of a particular alcohol extractant must always be made in view of the particular slurrying medium to be used so they will not be miscible in all proportions and the alcohol will not extract the polymer from its slurrying medium under extraction conditions. In addition to the use of water to reduce the solubility of the alcohol in the slurrying liquid, salts such as KCl, $CaCl_2$, etc., can be used and in fact any countersolvent component, solid or liquid, which is soluble in the alcohol but substantially insoluble in the polymer and slurrying medium therefore. Salts would normally be used in amounts of less than 10% by weight, and preferably about 1 to 5%.

Also, water itself can be used as the catalyst extracting fluid, but is not normally as effective as the alcohols and does not normally do as good a job of extracting the catalyst residues, except possibly when using small amounts of water under optimum conditions. If water is used as the extractant, the addition of a wetting agent will normally improve the contacting and so the catalyst extraction. There is no criticality in the type of wetting agent to use in the water, i.e., anionic, cationic, or nonionic wetting agents can be used. A typical example of a suitable anionic wetting agent is sodium stearate, of cationic is cetylpyridinium chloride, and of anionic are sulphated fatty alcohols marketed under the trade name "Gardinols." These wetting agents would normally be used in the water in amounts of less than 5% and normally in concentrations of 0.1 to 1%.

Also, dilute (less than 10% concentration acid) aqueous solutions of hydrochloric, sulfuric, or other acids, can be used as the extractant but are not to be preferred normally, since the polymer would probably have to be water-washed to remove the residual acid. However, acid will remove metal components more completely.

The volume of alcohol or other liquid extractant for the catalyst can normally be used in amounts as low as 2 or 3 lbs./lb. of polymer or lower, but, of course, this ratio can be increased to 10 or more to 1 or more, if desired. Usually it will be desired to use a ratio of extractant to polymer of less than 5 to 1, and it can be desirable, especially in the case of water to use ratios as low as 1 to 1 or less.

The extraction column can be operated at atmospheric pressure or at super-atmospheric pressure, the latter being preferred if it is desired to run the column at increased temperatures or using volatile solvents and/or slurrying liquids. Normally vacuum operation of the extraction column would not be preferred but it is possible that under some conditions, it would be the most desirable way to operate the column. Higher or lower temperatures than normal temperatures may sometimes be preferred depending on the particular solvent or slurrying medium and the nature of the polymer and/or catalyst residues being processed. If the column is run as a part of a continuous polymerization process which is run under superatmospheric pressure, it may be desirable to operate the extraction column under pressure.

In considerable detail, the types of polymers, catalysts to be extracted therefrom, slurrying mediums, and extractants have been discussed in the foregoing paragraphs; however, the invention will be more clearly understood from the following detailed description of specific examples thereof read in conjunction with the accompanying flow diagram.

The flow diagram shows a continuous polymerization system beginning with the reactor wherein the polymers are produced and continuing through the extraction column and the slurrying medium recovery and drying steps for the polymer, resulting in the production of the finished polymer product. Reference is now made particularly to the attached flow diagram wherein all the major processing vessels are shown and some of the pumps and valves but no attempt has been made to show all the pumps and valves since the diagram is merely intended to be a flow diagram. Reactor 1 is preferably glass lined to have optimum corrosion resistance but metal lined reactors made of corrosion resistant metals can also be used. The reactor is agitated by stirrer 2 which is driven by motor 3. Ethylene is introduced at the bottom of the reactor through line 4, and the catalyst, triisobutylaluminum and titanium tetrachloride reaction product, is introduced slurried in n-heptane through line 5. The n-heptane used to introduce the catalyst is added in sufficient amounts to act as a slurrying medium for the polymer produced in the reactor. Polymer slurried in n-heptane and containing catalysts is removed near the top of the reactor through line 6 to cooler 7, which is used to remove heat of polymerization from the reactants. Normally it would be preferred to use a conventional scraped cooler for maximum efficiency and to prevent plugging. The polymer slurry leaves the cooler via line 8 which is connected to pump 9 and the cooled polymer slurry leaves pump 9 via line 10. A portion of the polymer slurry is returned to the bottom of the reactor by line 11. The balance of the polymer slurry is transmitted via line 12 to mixer 13. The polymerization reaction is quenched in line 12 by the introduction of hot methanol by line 14 and the polymer slurry containing catalyst is thoroughly mixed with the methanol in mixer 13. The quenched polymer leaves mixer 13 by line 15 which feeds kettle 16. The quenching step wherein the methanol is added is for the purpose of deactivating the polymerization catalyst and solubilizing it for removal from the polymer, thus completely halting the polymerization. Actually mixer 13 was not used in experiments which will be described below; however, such a mixer may be desirable in a commercial plant. Mixer 13 could suitably be a conventional turbine type pipe line mixer. Kettle 16 is a stirred kettle having a stirrer 17 operated by motor 18. The purpose of this kettle was to provide for the thorough mixing of the methanol and polymer catalyst mixture so as much of the catalyst as possible would be deactivated and solubilized in this step. Actually, experience has shown that the few hours holding time in kettle 16 was not required and this kettle could actually be eliminated from the process entirely—mixing in the pipes and/or the mixer 13 being of sufficient intensity and time to solubilize the catalyst in the methanol. The mixture of methanol polymer slurry and catalyst leaves kettle 16 by line 19 to pump 20, which transfers the mixture by line 21 to decanter 22. Suitably, the mixture proceeds through internal pipe 23 within the decanter and is introduced into the decanter at a point near the bottom thereof. Methanol containing on the order of about 85 to 95% of the catalyst separates in the decanter as a lower layer and polymer slurried in the n-heptane forms the upper layer. It will be desirable to cool or refrigerate the mixture prior to decantation to reduce the solubility of the methanol in the n-heptane and facilitate the initial catalyst removal. This was not necessary in the particular equipment used since sufficient cooling occurred in the lines and vessels. Cooling may be necessary in a commercial plant, if ambient temperatures are high. The methanol layer can then be continuously or intermittently withdrawn from the decanter by line 24 through valve 24a. Polymer slurry is withdrawn from the upper portion of the decanter by line 25 to pump 26 which transfers the polymer slurry by line 27 to the bottom portion of extraction column 28. Normally it is preferred to dilute the polymer slurry prior to extraction and this can be suitably done by recycling a portion of the n-heptane recovered from the polymer in a later centrifuging step via line 29 through valve 29a to the suction side of pump 26. The extraction medium which is in this case methanol saturated with n-heptane is introduced near the top of the extraction column by line 30. A preferred contactor 28 for use in the process of the inventor is described in detail in U.S. 2,601,674 and consists of a vertical closed column 31 of circular cross section and cylindrical shape having a coaxial rotor shaft 32 which is operated by motor 33. Fixed to rotor shaft 32 are a number of circular imperforate baffles 34 which are actually 24 in number in the particular apparatus used to obtain the data presented below. The inner wall of the column is equipped with annular horizontal stator rings 35 having circular central openings concentric with the rotor shaft. These stator rings 35 form a number, 24 in this case, of compartments. The inner diameter of the stator rings is greater than the diameter of the rotor baffles facilitating easy assembly or disassembly of the extraction column. Any other type of liquid-liquid extraction equipment suitable for handling slurries could be used instead of column 28; however, this column is preferred. Examples of such equipment are a series of conventional mixing and settling tanks, spray columns and baffle plate columns as described by Coulson and Richardson (Chemical Engineering, vol. 2, p. 767, McGraw-Hill), pulsed columns as desiribed by Treybal (Mass Transfer Operation, p. 380–1, McGraw-Hill), multistage mixer columns as described by Oldshue and Rushton (Chemical Engineering Progress 48, 297–306, 1952) and Schiebel (A.I.Ch.E. Journal 2, 74–8, 1956). The polymer slurry proceeds up column 28 against the downcoming methanol saturated with n-heptane extractant by gravity flow. It will be desirable or necessary to insulate and cool or refrigerate the extraction column and materials fed thereto, particularly in warm weather, to reduce the solubility of the methanol in the n-heptane and so facilitate the extraction. The stage contacting is accomplished in each compartment as a result of the compartmentation and the spinning rotor baffle therein which provides for the contacting of the immiscible fluid layers therein. Spent methanol extractant containing the extracted catalyst residues is removed from the bottom of the extraction column by line 36 through valve 36a. Extracted polymer slurry is removed near the top of the column by line 37 and transported therein to continuous centrifuge 38 of conventional design. A rotary vacuum filter might be used in place of the centrifuge shown. Suitably the extracted slurried polymer could be stored and separated from the slurrying solvent in batchwise manner, if desired. n-Heptane filtrate is removed from the centrifuge by line 39 through valve 39a, but suitably, as previously described, a portion of this n-heptane filtrate is recycled to the polymer slurry being charged to the extraction column for the purpose of making a less dense and less viscous slurry implementing the extraction process. Polymer from which the great bulk of the slurrying medium, namely, n-heptane has been removed is taken from the centrifuge by line 40 through valve 40a and charged to a continuous dryer 41 of conventional design. From this dryer via line 42 the dried polymer product is removed, and the vaporized n-heptane containing a small amount of methanol is removed by line 43 and recovered by conventional methods for reuse, if desired.

Referring again to the flow diagram, an alternative, although not normally preferred, may of carrying out the process will be described. It is possible to do the quenching of the polymer slurry in the extraction column itself as well as the extraction of the catalyst. In such a method the polymer slurry in line 12 would be introduced directly near the bottom of the extraction column with or without the addition of methanol from line 14. If methanol were added to the polymer slurry from line 14, the bottom portion of the extraction column would serve as a decanter for this additional methanol in which case it would be desirable to enlarge the bottom portion of the column below the baffles to better handle the additional methanol. If additional methanol were not added to the polymer via line 14, the spent methanol extractant coming down the column would act as the quenching medium and solubilizer for the catalyst.

The major vessels like the mixer, centrifuge and dryer which are shown dotted on the flow diagram were not actually used as a part of the continuous process. Rather the extracted polymer containing the slurrying medium from the extraction column was stored and later filtered and dried in batchwise manner to produce the finished product. However, continuous centrifuges and continuous dryers are available commercially for this use and might be preferred to be used in connection with the continuous process rather than the batch finishing of the extracted polymer. The major vessels and lines can suitably be made of stainless steel although it may be desirable to make the lines and vessels of a corrosion resistant material such as Monel or other suitable corrosion-resistant metal, or lined with glass or suitable synthetic resin, where the vessels or lines are exposed to appreciable quantities of catalyst or decomposition products thereof which may tend to corrode them.

A number of runs were actually made in pilot plant sized equipment of the nature of that shown in the flow diagram. The size of the major vessels will be given as an indication of the holding time in the various vessels but it must be realized that these vessels were designed for experimentation over a broad range of operating conditions and are not necessarily of optimum size for the feed rates actually used in the experimentation. The reactor is 16 inches in diameter and 28 inches high. The kettle is 20 inches in diameter by 20 inches high. The decanter is 6 inches in diameter by 12 inches high. The extraction column is 3 inches in diameter by 36 inches high and contains 24 compartments each 0.8 inch high. These runs are summarized in Tables I, II, III, and IV below. In obtaining the data which follows, polymer slurry was actually recycled through the heat exchanger to the reactor in the reverse direction to that shown in the flow diagram, but it is believed that the flow diagram method is somewhat preferable.

TABLE I

Continuous Pilot Plant

Polymerization and Quench Section

| Run | 1 | 2 | 3 | 4 |
|---|---|---|---|---|
| Time (hours)[1] | 15.4 | 22.6 | 25.9 | 4.3 |
| Solvent | (2) | (2) | (2) | (3) |
| Solvent feed rate (lbs./hr.) | 44.8 | 43.0 | 42.7 | 45 |
| Solvent water content (p.p.m.) | 11 | 12 | 8 | 12 |
| Ethylene feed rate (lbs./hr.) | 8.0 | 8.0 | 8.0 | 8.0 |
| TiCl₄ feed rate (lbs./hr.) | 0.233 | 0.233 | 0.235 | 0.240 |
| Al/Ti mole ratio | 0.47 | 0.48 | 0.43 | 0.48 |
| Polymerization temp. (° C.) | 70 | 70 | 70 | 70 |
| Quench methanol feed rate (lbs./hr.) | 7.2 | 6.7 | 9.0 | 8.7 |
| Quench methanol water content (p.p.m.) | 18 | 28 | 29 | 6 |

[1] This does not include start-up time or the time required for unit to level out or come to equilibrium, which was ordinarily about 5 hours.
[2] Phillips commercial n-heptane.
[3] Phillips commercial isooctanes.

TABLE II

*Continuous Pilot Plant*

*Product Recovery Section*

| Run | 1(a) | 1(b) | 1(c) | 1(d) |
|---|---|---|---|---|
| Run duration (hrs.) | 3.7 | 6.0 | 3.8 | 2.6. |
| Rotor speed (r.p.m.) | 330 | 360 | 360 | 460. |
| Decanter extract density (g./cc.) | | | 0.846 at 22° C | 0.854 at 22° C. |
| Slurry feed: | | | | |
|   Density (g./cc.) | 0.740 at 22° C | 0.735 at 22° C | 0.735 at 22° C | 0.735 at 22° C. |
|   Temperature (° C.) | 19-20 | 16-19 | 18-19 | 19-20. |
| Extractant feed: | | | | |
|   Composition | | Methanol saturated with heptane | | |
|   Water content (percent) | 0.0087 | 0.0087 | 0.0087 | 2.62. |
|   Feed rate (lbs./hr.) | 11.2 | 10.6 | 4.4 | 12. |
|   Temperature (° C.) | 17-20 | 18-22 | 18-19 | 20-21. |
|   Density (g./cc.) | | 0.771 at 22° C | 0.760 at 22° C | 0.780 at 22° C. |
| Extract: | | | | |
|   Density (g./cc.) | 0.760 at 22° C | 0.761 at 22° C | 0.760 at 22° C | 0.778 at 22° C. |
|   Temperature (° C.) | 17-18 | 17-18 | 18 | 13-14. |
| Extracted slurry: | | | | |
|   Density (g./cc.) | 0.735 at 23° C | 0.744 at 22° C | 0.740 at 21° C | 0.732 at 23° C. |
|   Temperature (° C.) | 22-23 | 17-24 | 23-24 | 23. |
|   Solids (percent) | 8.9 | 12.3 | 9.8 | 9.6. |
|   Flow rate (lbs. slurry/hr.) | 14.5 | 9.6 | 20.6 | 31. |
|   Flow rate (lbs. solids/hr.) | 1.3 | 1.2 | 2.0 | 3.0. |
| Product assay: | | | | |
|   Chlorine (p.p.m.) | 100 | 100 | 120 | 90. |
|   Titanium (p.p.m.) | 3 | 24 | 1 | 2. |
|   Aluminum (p.p.m.) | 3 | 4 | 4 | 5. |

[1] 4.5 lbs./hr of n-heptane filtrate recovered from the extracted polymer of run 2(b) was added to the slurry of this run to dilute it before extraction.

| Run | 2(a) | 2(b) | 2(c)[1] | 2(d) |
|---|---|---|---|---|
| Run duration (hrs.) | 7.5 | 7.7 | 7.0 | 7.3. |
| Rotor speed (r.p.m.) | 280 | 280 | 340 | 340. |
| Decanter extract density (g./cc.) | 0.809 at 19° C | 0.849 at 19° C | 0.825 at 19° C | 0.819 at 19° C. |
| Slurry feed: | | | | |
|   Density (g./cc.) | 0.744 at 17° C | 0.750 at 17° C | 0.750 at 17° C | 0.745 at 17° C. |
|   Temperature (° C.) | 17 | 15-17 | 15-16 | 16-22. |
| Extractant feed: | | | | |
|   Composition | | Methanol saturated with heptane | | |
|   Water content (percent) | 0.0093 | 0.0093 | 0.0082 | 0.0082. |
|   Feed rate (lbs./hr.) | 11.7 | 8.6 | 11.1 | 11.1. |
|   Temperature (° C.) | 17 | 15-18 | 15-16 | 16-20. |
|   Density (g./cc.) | 0.772 at 19° C | 0.770 at 17° C | 0.768 at 20° C | |
| Extract: | | | | |
|   Density (g./cc.) | 0.770 at 18° C | 0.770 at 17° C | 0.770 at 16° C | 0.770 at 17° C. |
|   Temperature (° C.) | 16 | 14-17 | 15 | 14-20. |
| Extracted slurry: | | | | |
|   Density (g./cc.) | 0.745 at 18° C | 0.751 at 15° C | 0.748 at 18° C | 0.751 at 17° C. |
|   Temperature (° C.) | | 21 | 19-20 | 16-22. |
|   Solids (percent) | 10.4 | 10.3 | 8.9 | 9.5. |
|   Flow rate (lbs. slurry/hr.) | 20 | 16.8 | 18.0 | 10.6. |
|   Flow rate (lbs. solids/hr.) | 2.1 | 1.7 | 1.6 | 1.0. |
| Product assay: | | | | |
|   Chlorine (p.p.m.) | 128 | | 93 | 125. |
|   Titanium (p.p.m.) | 0 | 11 | 0 | 0. |
|   Aluminum (p.p.m.) | 22.1 | 7 | 8 | 7. |

[1] 4.5 lbs./hr of n-heptane filtrate recovered from the extracted polymer of run 2(b) was added to the slurry of this run to dilute it before extraction.

| Run | 2(e) | 2(f)[1] | 2(g) | 3(a) |
|---|---|---|---|---|
| Run duration (hrs.) | 6.0 | 5.0 | 7.0 | 8.3. |
| Rotor speed (r.p.m.) | 320 | 320 | 340 | 380. |
| Decanter extract density (g./cc.) | 0.821 at 19° C | 0.825 at 17° C | 0.831 at 17° C | 0.807 at 19° C. |
| Slurry feed: | | | | |
|   Density (g./cc.) | 0.748 at 17° C | 0.747 at 17° C | 0.750 at 17° C | 0.762 at 19° C. |
|   Temperature (° C.) | 14-16 | 14-18 | 16-19 | 12-14. |
| Extractant feed: | | | | |
|   Composition | | Methanol saturated with heptane | | |
|   Water content (percent) | 2.12 | 2.12 | ~3 | 0.0153. |
|   Feed rate (lbs./hr.) | 11.3 | 11.2 | 10.4 | 5.3. |
|   Temperature (° C.) | 13-14 | 14-17 | 16-18 | 10-14. |
|   Density (g./cc.) | 0.790 at 17° C | | | 0.768 at 19° C. |
| Extract: | | | | |
|   Density (g./cc.) | 0.764 at 17° C | | | 0.780 at 17° C. |
|   Temperature (° C.) | | 14-17 | 19-21 | 10-14. |
| Extracted slurry: | | | | |
|   Density (g./cc.) | 0.746 at 14° C | 0.746 at 16° C | 0.749 at 16° C | 0.753 at 15° C. |
|   Temperature (° C.) | 14-16 | 17-20 | 17-19 | 15-20. |
|   Solids (percent) | 11.5 | 8.9 | 11.0 | 11.4. |
|   Flow rate (lbs. slurry/hr.) | 30.4 | 16.4 | 34.4 | 26. |
|   Flow rate (lbs. solids/hr.) | 3.5 | 1.5 | 3.8 | 3.0. |
| Product assay: | | | | |
|   Chlorine (p.p.m.) | 122 | 133 | | |
|   Titanium (p.p.m.) | 0 | 0 | 0 | 0. |
|   Aluminum (p.p.m.) | 6.9 | 4.9 | 6.4 | 6.1. |

[1] 4.5 lbs./hr. of n-heptane filtrate recovered from the extracted polymer of run 2(b) was added to the slurry of this run to dilute it before extraction.

| Run | 3(b) | 3(c) | 3(d) | 3(e) |
|---|---|---|---|---|
| Run duration (hrs.) | ~9 | 7.8 | 4.9 | 5.2. |
| Rotor speed (r.p.m.) | 300–360 | 306 | 340 | 480. |
| Decanter extract density (g./cc.) | 0.806 at 18° C | 0.805 at 18° C | 0.802 at 20° C | 0.805 at 18° C. |
| Slurry feed: | | | | |
| Density (g./cc.) | 0.762 at 20° C | 0.782 at 17° C | 0.735 at 17° C | 0.760 at 17° C. |
| Temperature (° C.) | 14–16 | 14–16 | 17 | 17–20. |
| Extractant feed: | | | | |
| Composition | | Methanol saturated with heptane | | |
| Water content (percent) | 0.0153 | 0.0067 | ~1 | 3.25. |
| Feed rate (lbs./hr.) | 8 | 13 | 11 | 10. |
| Temperature (° C.) | 15–16 | 15 | 19–20 | 15–20. |
| Density (g./cc.) | 0.768 at 19° C | 0.768 at 19° C | 0.786 at 18° C | 0.790 at 19° C. |
| Extract: | | | | |
| Density (g./cc.) | | | 0.774 at 18° C | |
| Temperature (° C.) | 14–15 | 14–15 | 17 | 14–18. |
| Extracted slurry: | | | | |
| Density (g./cc.) | 0.744 at 15° C | 0.748 at 14° C | 0.752 at 18° C | 0.740 at 16° C. |
| Temperature (° C.) | 16–20 | 20 | 23 | 16–23. |
| Solids (percent) | 9.8 | 9.5 | 11.5 | 14.4. |
| Flow rate (lbs. slurry/hr.) | 10 | 14 | 31 | 24. |
| Flow rate (lbs. solids/hr.) | 1.0 | 1.3 | 3.6 | 3.5. |
| Product assay: | | | | |
| Chlorine (p.p.m.) | | | 3.0 | 6.8. |
| Titanium (p.p.m.) | 8.3 | 0 | 4 | 9.1. |
| Aluminum (p.p.m.) | 0 | 4.9 | | |

| Run | 3(f) | 3(g) | 4(a) | 4(b) |
|---|---|---|---|---|
| Run duration (hrs.) | 3.0 | 0.6 | 7. | 5. |
| Rotor speed (r.p.m.) | 524 | 1,020 | 310–490 | 470–480. |
| Decanter extract density (g./cc.) | 0.805 at 18° C | 0.803 at 19° C | 0.810 at 16° C | 0.828 at 16° C. |
| Slurry feed: | | | | |
| Density (g./cc.) | 0.757 at 17° C | | | |
| Temperature (° C.) | 18 | 18 | 16–17 | 16–17. |
| Extractant feed: | | | | |
| Composition | Meth. sat. with heptane. | Distilled water | (1) | Meth. sat. with isooctane. |
| Water content (percent) | 8.27 | 100 | Dry | Dry. |
| Feed rate (lbs./hr.) | 10 | 26 | 6 | 13. |
| Temperature (° C.) | 18 | 17–18 | 17–18 | 18. |
| Density (g./cc.) | 0.810 | 1.0 | | |
| Extract: | | | | |
| Density (g./cc.) | | 0.970 at 18° C | 0.780 at 16° C | 0.790 at 16° C. |
| Temperature (° C.) | 16 | 17–18 | 12–16 | 15–16. |
| Extracted slurry: | | | | |
| Density (g./cc.) | 0.760 at 18° C | 0.745 at 19° C | 0.724 at 18° C | 0.722 at 18° C. |
| Temperature (° C.) | 18 | 17–18 | 18–20 | 18–20. |
| Solids (percent) | 13.1 | | 10.7 | 12.1 |
| Flow rate (lbs. slurry/hr.) | 46 | 36 | 51 | 40. |
| Flow rate (lbs. solids/hr.) | 6.0 | | 5.5 | 4.9. |
| Product assay: | | | | |
| Chlorine (p.p.m.) | | | 12 | 61. |
| Titanium (p.p.m.) | 9.2 | 100 | 23 | 0. |
| Aluminum (p.p.m.) | 4 | 4 | | |

[1] Methanol saturated with Phillips commercial isooctanes.

| Run | 4(c) | 4(d) | 4(e) | 4(f)[1] |
|---|---|---|---|---|
| Run duration (hrs.) | 3.3 | | 0.5 | 3.2. |
| Rotor speed (r.p.m.) | | 1,160 | 1,460 | 1,460. |
| Decanter extract density (g./cc.) | 0.82 at 16° C | 0.792 at 16° C | 0.790 at 17° C | 0.790 at 17° C. |
| Slurry feed: | | | | |
| Density (g./cc.) | | | | |
| Temperature (°C.) | 16–19 | 13–15 | 13 | 13. |
| Extractant feed: | | | | |
| Composition | Meth. sat. with iso-octanes. | Distilled water | (2) | (2). |
| Water Content (percent) | ~3 | ~3 | 7 | 4. |
| Feed rate (lbs./hr.) | 9 | | 18 | 17–18. |
| Temperature (°C.) | 19–23 | 17–18 | | |
| Density (g./cc.) | | | | |
| Extract: | | | | |
| Density (g./cc.) | 0.796 at 16° C | 0.970 at 17° C | 0.986 at 17° C | 15–16. |
| Temperature (°C.) | 16–17 | 16 | 16 | |
| Extracted slurry: | | | | |
| Density (g./cc.) | 0.720 at 18° C | 0.737 at 19° C | 0.736 at 19° C | 0.739 at 19° C. |
| Temperature (°C.) | 19–21 | 15–19 | 19 | 19–20. |
| Solids (percent) | 10.7 | 12.8 | 10.9 | 11.5. |
| Flow rate (lbs. slurry/hr.) | 53 | 58 | 49 | (3). |
| Flow rate (lbs. solids/hr.) | 5.7 | 7.3 | 5.4 | |
| Product assay: | | | | |
| Chlorine (p.p.m.) | | | | 51–54. |
| Titanium (p.p.m.) | 179 | 113 | 86 | N.D. |
| Aluminum (p.p.m.) | 6 | 5 | 0 | |

[1] Reextracted with distilled water to remove Sterox CD form polymer.
[2] Distilled water plus ½% "Sterox CD", a nonionic surface-active agent.
[3] Steady state operations not achieved.

TABLE III

*Continuous Pilot Plant*

*Product Properties*

| Run | 1 | 2 | 3 | 4 |
|---|---|---|---|---|
| Density (g./cc.) | 0.9474 | 0.9475 | 0.9481 | 0.9452 |
| Tensil properties: | | | | |
| Strength (p.s.i.): | | | | |
| Yield | 3,626 | 3,590 | | 3,475 |
| Ultimate | 1,663 | 1,716 | 3,586 | 1,754 |
| Elongation (percent): | | | | |
| Yield | 15 | 15 | | 12 |
| Ultimate | 104 | 137 | 15(?) | 152 |
| Flow properties: | | | | |
| Melt index | 2.1 | 1.2 | 1.8 | 0.20 |
| Recovery (percent) | 90.2 | 80.4 | 92.7 | 64.6 |
| Specific viscosity [1] | 0.149 | 0.165 | 0.159 | 0.186 |
| Average molecular weight [2] | 47,000 | 53,000 | 52,000 | 61,000 |

[1] Specific viscosity of 0.05 g. polyethylene dissolved in 50 ml. xylene at 100° C.

[2] Weight average molecular weight.

TABLE IV

*Continuous Pilot Plant*

*Typical Screen Analysis of Dried Product*

| Mesh, U.S. sieve standards, 7 screens | Weight percent retained on screen | Opening in screen, inches |
|---|---|---|
| 60 | 27.7 | 0.0098 |
| 80 | 7.5 | 0.0070 |
| 100 | 6.1 | 0.0059 |
| 140 | 18.2 | 0.0041 |
| 200 | 15.0 | 0.0029 |
| 325 | 19.6 | 0.0017 |
| Pan | 5.9 | |

The data obtained from the continuous pilot plant in the polymerization and quench section are summarized in Table I. It is believed that these data speak for themselves. It includes four separate runs. In Table II is summarized the data on the product recovery section of the pilot plant wherein the continuous extractor was used. In all the experiments for which data is shown above the extractant was the continuous phase and the polymer slurry the dispersed phase; however, the extraction can be carried out with the polymer slurry as the continuous phase and the extractant as the dispersed phase. It will be noted that Table II contains many more runs which are numbered 1 through 4, inclusive, with separate designating letters identifying each run. All the runs numbered 1 were made on polymer produced by polymerization run 1 of Table I. All the runs numbered 2 were made on polymer produced from run 2 of Table I and correspondingly for the other runs. The wide variety of runs that were made in Table II, of course, were made to investigate the several variables and operating conditions for the extraction column. In general, it may be said referring to the product assay results that the polymer is of suitable commercial quality for most any use if the chlorine content is of the order of about 100 to 125 p.p.m., and the titanium and aluminum contents are of the order of about 10 to 20 p.p.m. Throughout most of the runs n-heptane has been used as the slurrying medium for the polymer and methanol saturated with n-heptane as the catalyst extraction medium. In a few of the runs, isooctanes were used as the slurrying medium for the polymer and methanol saturated with isooctanes as the extractant, and in a few of the other runs, distilled water was used as the extractant with a small percentage of a nonionic surface-active agent being used in the distilled water of some of the runs. In general, water doesn't seem to be as good an extractant as methanol from the runs shown. However, an insufficient number of runs were made using water to reach optimum operating conditions. It appeared that the addition of a nonionic/surface-active agent (Sterox CD) to the distilled water aided some in reducing the amount of titanium in the polymer. "Sterox CD" is a polyoxyethylene ether marketed by the Inorganic Division of the Monsanto Chemical Company. Complete data was not obtained on the conditions of the isooctanes runs and very few experiments were conducted, but it is indicated that if more extraction stages were used isoocatanes would be substantially equivalent to n-heptane. The speed of the rotors is not particularly critical but should be sufficiently fast to give good mixing in each stage of the immiscible fluids and yet not sufficiently high to cause emulsification from top to bottom in the column or poor separation of the fluids from stage to stage. Most of the data was obtained using methanol extractant and n-heptane as the slurrying medium and consistently, except where there were wide variation of conditions, satisfactory commercial polymer was produced.

In the above experiments, solid polyethylene was produced having properties, which are set forth in detail in Tables III and IV.

The above experimental results should, of course, be merely taken as illustrative of the inventive process and not limiting as the process is broadly applicable to the extraction of Ziegler catalyst from Ziegler polymers other than polyethylene as set forth above; and, in fact, this process can be applied in general to the extraction of catalyst residues from solid polymer particles whether produced by Ziegler type catalysts or other closely related types of catalysts, when suitable slurrying mediums and catalyst extractants are chosen.

Throughout the specification and claims all ratios and percentages are intended to be by weight unless otherwise specified.

Although the invention has been described in terms of specified apparatus and reactants which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

I claim:

1. In a continuous polymerization process wherein a monomer is subjected to polymerisation in the presence of a Ziegler polymerization catalyst, adaptable for the low-pressure polymerization of ethylene, and a liquid hydrocarbon slurrying medium for the polymer in at least a sufficient amount to make a polymer layer which is not too viscous for extraction, a slurry of solid polymer particles is produced in said medium and said polymer particles are thereafter recovered from said medium, the improvement for removing residues of said Ziegler catalyst from said polymer wherein said slurry is subjected to continuous countercurrent multistage solvent extraction by means of a liquid hydroxyl-group-containing solvent for said residues, said solvent under extraction conditions being not more than partially miscible with said slurrying medium and not being capable of extracting said polymer from said medium, and withdrawing separate phases of polymer slurried in said medium and residues of said catalyst in said solvent.

2. In a continuous ethylene polymerization process wherein ethylene is subjected to polymerization in the presence of a Ziegler polymerization catalyst, adapted for the low-pressure polymerization of ethylene, and a liquid hydrocarbon slurrying medium for the polymer in an amount of at least about 3 parts of slurrying medium per part of polymer, a slurry of solid polyethylene particles is produced in said medium, said slurry is intimately mixed with a liquid monohydroxy alcohol at an elevated temperature to solubilize the catalyst and quench the polymerization reaction, said polyethylene slurry is separated from said alcohol at a temperature at which phase separation will occur and said polyethylene particles are thereafter recovered from said slurrying medium, the improvement wherein said separated polyethylene slurry containing only residual amounts of catalyst is subjected to continuous countercurrent multistage solvent extraction using a liquid hydroxyl-group-containing solvent for said catalyst, said solvent under extraction conditions being not more than partially miscible with said slurrying medium and not being capable of extracting said polymer from said medium, and withdrawing separate phases of polymer slurried in said medium and Ziegler type catalyst residues in said solvent.

3. A process of extracting residues of Ziegler polymerization catalyst, adapted for the low-pressure polymerization of ethylene, from particles of solid polymers comprising subjecting a slurry of said polymer particles in a liquid slurrying medium selected from the class consisting of hydrocarbons, halogenated hydrocarbons and hydrocarbon ethers in at least a sufficient amount to make a polymer layer which is not too viscous for extraction, to countercurrent multistage solvent extraction using a liquid solvent for said catalyst residues, said solvent under extraction conditions being not more than partially miscible with said slurrying medium and not being capable of extracting said polymer from said medium, and withdrawing separate phases of polymer slurried in said medium and residues of said catalyst in said solvent.

4. A process of claim 3 wherein said method is a continuous extraction method.

5. A method of extracting triisobutyl aluminum-titanium tetrachloride catalyst residues from particles of solid polyethylene comprising subjecting a slurry in the range of about 5 to about 20 parts per part of said polyethylene particles of saturated aliphatic hydrocarbon having between 3 to about 12 carbon atoms per molecule to continuous countercurrent multistage extraction using an amount in the range of about 1 to about 10 parts per part of polymer of a methanolic media containing not less than 90% of $CH_3OH$, and withdrawing separate phases of extracted polyethylene particles slurried in said aliphatic hydrocarbon and said catalyst residues in said methanolic media.

6. A process of extracting residues of Ziegler polymerization catalyst, adapted for the low-pressure polymerization of ethylene, from particles of solid polymer comprising subjecting a slurry of said polymer particles in a liquid hydrocarbon slurrying medium in at least a sufficient amount to make a polymer layer which is not too viscous for extraction, to countercurrent multistage solvent extraction using a liquid hydroxyl-group-containing solvent for said residues, said solvent under extraction conditions being not more than partially miscible with said slurrying medium and not being capable of extracting said polymer from said medium, and withdrawing separate phases of polymer slurried in said medium and residues of said catalyst in said solvent.

7. A process of claim 6 wherein said polymer is derived from aliphatic olefinic hydrocarbons having not more than 5 carbon atoms per molecule.

8. A process of claim 6 wherein said slurrying medium is selected from saturated hydrocarbons having between 3 to about 12 carbon atoms per molecule.

9. A process of claim 6 wherein said slurrying medium is selected from saturated aliphatic hydrocarbons having between 3 to about 12 carbon atoms per molecule.

10. A process of claim 6 wherein said process is a continuous extraction process.

11. A process of claim 6 wherein said solvent is an aqueous medium comprising water in major amount.

12. A process of claim 6 wherein said solvent is an alcoholic medium comprising in major amount alkyl alcohols having not more than 8 carbon atoms.

13. A process of claim 6 wherein said solvent is an alcoholic medium comprising methanol in major amount.

14. A process of claim 6 wherein said Ziegler catalyst is derived by interaction of an aluminum compound with a compound of a heavy metal from groups IV-B to VI-B.

15. A process of claim 6 wherein said catalyst is a Ziegler catalyst containing titanium and aluminum.

16. A process of claim 6 wherein said Ziegler catalyst is derived by interaction of an alkyl aluminum compound having not more than 4 carbon atoms per alkyl group and a titanium chloride compound.

17. A process of extracting residues of Ziegler polymerization catalyst, adapted for the low-pressure polymerization of ethylene and derived by interaction of an alkyl aluminum compound having not more than 4 carbon atoms per alkyl group and a titanium chloride compound, from particles of solid polymer derived from aliphatic olefinic hydrocarbon having not more than five carbon atoms comprising subjecting a slurry of said polymer particles in a slurrying medium selected from saturated aliphatic hydrocarbons having between 3 to about 12 carbon atoms per molecule, said slurry medium being present in at least a sufficient amount to make a polymer layer which is not too viscous for extraction, to continuous countercurrent multistage solvent extraction using an alcoholic medium solvent for said residues comprising in major amount alkyl alcohols having not more than 8 carbon atoms, said solvent under extraction conditions being not more than partially miscible with said slurrying medium and not being capable of extracting said polymer from said medium, and withdrawing separate phases of polymer slurried in said medium and residues of said catalyst in said solvent.

18. A process of claim 17 wherein said alcohols are methanol.

19. A process of extracting residues of Ziegler polymerization catalyst, adapted for the low-pressure polymerization of ethylene and derived by interaction of an alkyl aluminum compound having not more than 4 carbon atoms per alkyl group and a titanium chloride compound, from particles of solid polymer derived from aliphatic olefinic hydrocarbon having not more than five carbon atoms comprising subjecting a slurry of said polymer particles in a slurrying medium selected from saturated aliphatic hydrocarbons having between 3 to about 12 carbon atoms per molecule, said slurrying medium being present in at least a sufficient amount to make a polymer layer which is not too viscous for extraction, to continuous countercurrent multistage solvent extraction using an aqueous medium solvent for said residues comprising water in major amount, said solvent under extraction conditions being not more than partially miscible with said slurrying medium and not being capable of extracting said polymer from said medium, and withdrawing separate phases of polymer slurried in said medium and residues of said catalyst in said solvent.

References Cited in the file of this patent

UNITED STATES PATENTS

| | | |
|---|---|---|
| 2,601,674 | Reman | June 24, 1952 |
| 2,699,457 | Ziegler | Jan. 11, 1955 |
| 2,813,136 | Mertz | Nov. 12, 1957 |
| 2,846,427 | Findlay | Aug. 5, 1958 |
| 2,898,327 | McCullouch et al. | Aug. 4, 1959 |
| 2,905,645 | Anderson et al. | Sept. 22, 1959 |
| 2,910,461 | Nowlin et al. | Oct. 27, 1959 |
| 2,913,447 | Hofheim et al. | Nov. 17, 1959 |

FOREIGN PATENTS

| | | |
|---|---|---|
| 961,576 | Germany | Apr. 11, 1957 |
| 533,362 | Belgium | May 16, 1955 |

OTHER REFERENCES

Chemical Engineer's Handbook (Perry), published by McGraw-Hill, 3rd Edition, pages 717 and 928.